(12) United States Patent
Vasshus et al.

(10) Patent No.: US 11,065,646 B2
(45) Date of Patent: Jul. 20, 2021

(54) SIEVING APPARATUS AND METHOD OF USING SAME

(71) Applicant: Cubility AS, Sandnes (NO)

(72) Inventors: Jan Kristian Vasshus, Sandnes (NO); Arne Malmin, Kleppe (NO)

(73) Assignee: Cubility AS, Sandes (NO)

( * ) Notice: Subject to any disclaimer, the term of this patent is extended or adjusted under 35 U.S.C. 154(b) by 41 days.

(21) Appl. No.: 15/100,017

(22) PCT Filed: Nov. 27, 2014

(86) PCT No.: PCT/NO2014/050220
§ 371 (c)(1),
(2) Date: May 27, 2016

(87) PCT Pub. No.: WO2015/084179
PCT Pub. Date: Jun. 11, 2015

(65) Prior Publication Data
US 2017/0001219 A1  Jan. 5, 2017

(30) Foreign Application Priority Data

Dec. 2, 2013 (NO) .................................. 20131593

(51) Int. Cl.
*B07B 1/10* (2006.01)
*B01D 33/04* (2006.01)
(Continued)

(52) U.S. Cl.
CPC ............ *B07B 1/10* (2013.01); *B01D 33/0376* (2013.01); *B01D 33/04* (2013.01); *B01D 33/29* (2013.01);
(Continued)

(58) Field of Classification Search
CPC .... B07B 1/10; B07B 1/28; B07B 1/36; B07B 1/40; B07B 1/4663; B01D 33/03;
(Continued)

(56) References Cited

U.S. PATENT DOCUMENTS

| 4,255,269 | A | * | 3/1981 | Timmer | ............. | B01D 33/0346 |
| | | | | | | 175/66 |
| 4,283,285 | A | * | 8/1981 | Paschen | ................... | B07B 1/10 |
| | | | | | | 210/326 |

(Continued)

FOREIGN PATENT DOCUMENTS

| CA | 2445067 C | 4/2005 |
| EP | 652810 B2 | 7/2002 |

(Continued)

*Primary Examiner* — Charles A Fox
*Assistant Examiner* — Kalyanavenkateshware Kumar
(74) *Attorney, Agent, or Firm* — Gable Gotwals

(57) ABSTRACT

This invention relates to a sieving apparatus and method for separating solid particles above a predetermined size from a fluid by carrying the solids-containing fluid across at least one sieving cloth in a frame connected to a shaking device for providing shaking motion. The sieving apparatus includes an inlet portion for receiving solids-containing fluid, a discharge portion for solids that have been carried across the at least one sieving cloth and an outlet portion for fluid that has passed through the sieving cloth. The sieving apparatus further includes at least one endless sieving cloth arranged for rotating around at least two spaced-apart turning-rollers, at least one being connected to a motor, and a pumping device in fluid communication with a suction nozzle located proximate an underside of the endless sieving cloth between two of the turning-rollers, to produce a fluid flow through at least a portion of the endless sieving cloth.

12 Claims, 12 Drawing Sheets

(51) Int. Cl.
*B07B 1/28* (2006.01)
*B07B 1/46* (2006.01)
*E21B 21/06* (2006.01)
*B01D 33/03* (2006.01)
*B01D 33/29* (2006.01)
*B07B 1/36* (2006.01)
*B07B 1/40* (2006.01)

(52) U.S. Cl.
CPC ............... *B07B 1/28* (2013.01); *B07B 1/4663* (2013.01); *E21B 21/065* (2013.01); *E21B 21/066* (2013.01); *B07B 1/36* (2013.01); *B07B 1/40* (2013.01)

(58) Field of Classification Search
CPC .... B01D 33/0376; B01D 33/04; B01D 33/29; A47L 9/10; A47L 9/18; E21B 21/065; E21B 21/066
USPC .................. 209/269, 272, 307, 308, 643
See application file for complete search history.

(56) References Cited

U.S. PATENT DOCUMENTS

| | | | | |
|---|---|---|---|---|
| 4,392,951 A | * | 7/1983 | Omori | B07B 1/10 209/307 |
| 4,639,258 A | | 1/1987 | Schellstede et al. | |
| 5,517,906 A | * | 5/1996 | Zittel | A23L 3/02 134/63 |
| 5,924,217 A | * | 7/1999 | Peeters | F26B 17/045 34/236 |
| 2002/0000399 A1 | | 1/2002 | Winkler et al. | |
| 2005/0006149 A1 | | 1/2005 | Tettleton | |
| 2008/0223777 A1 | * | 9/2008 | Vasshus | B07B 1/10 210/384 |
| 2013/0092637 A1 | * | 4/2013 | Pomerleau | B07B 1/46 210/780 |
| 2014/0009303 A1 | * | 1/2014 | Vasshus | B01D 33/04 340/854.6 |

FOREIGN PATENT DOCUMENTS

| | | |
|---|---|---|
| NO | 303323 B1 | 6/1998 |
| NO | 308649 B1 | 10/2000 |
| NO | 319329 B1 | 7/2005 |
| NO | 323519 B1 | 4/2007 |
| NO | 326594 B1 | 1/2009 |
| NO | 20110775 A1 | 5/2011 |
| WO | 2006098638 A1 | 9/2006 |
| WO | 2007004889 A1 | 1/2007 |
| WO | 2012050456 A1 | 4/2012 |

\* cited by examiner

SIEVING APPARATUS AND METHOD OF USING SAME

CROSS-REFERENCE TO RELATED APPLICATIONS

This United States application is the National Phase of PCT Application No. PCT/NO2014/050220 filed 27 Nov. 2014, which claims priority to Norwegian Patent Application No. 20131593 filed 2 Dec. 2013, each of which is incorporated herein by reference.

The present invention relates to a sieving apparatus and a method of using same. More particularly, the invention relates to a sieving apparatus of the kind that has been arranged to separate solid particles above a predetermined size from a fluid, in that the solids-containing fluid is carried across at least one sieving cloth which has been arranged in a frame connected to a shaker device, to provide a shaking motion, wherein the sieving apparatus comprises an inlet portion for receiving the solids-containing fluid and a discharge portion for the solids carried across the at least one sieving cloth, as well as an outlet portion for the fluid that has passed through the sieving cloth.

The present invention is particularly directed towards cleaning of drilling fluid from cuttings, but is not limited to this as it will be suitable also in other contexts, where it is required to separate solid particles from a fluid.

Separation of solids from fluid flows, by passing a fluid through a filter or a sieving device, with perforations being of such a size that the solid particles will be retained on the sieve surface, instead of passing through, is a well-known technique. Some fluid flows contain other substances which cause the solid particles to agglomerate or stick together, or adhere to a sieve surface, resulting in bridging across sieve openings, and thus clogging the sieve. Such problems often arise in drilling of wells, wherein a drilling fluid or "mud" is circulated down into the well.

During a drilling work in the petroleum industry, drilling fluid is continuously circulated between the borehole and the surface in order to remove the drilled particles, also called cuttings, which the drill bit tears off. The cuttings are carried with the drilling mud to the surface, where the cuttings are separated from the drilling mud. The drilling mud is then recirculated into the well for the drilling work. Due to, among other things, the fact that the drilling mud is expensive, it is desirable for as much of it as possible to be reused. The drilling mud is kept as clean and free of contamination from cuttings and foreign objects as possible. Drilling mud is typically cleaned by means of several types of separate equipment incorporated in a process chain, including vibrating sieving devices, normally called "shale shakers" or "shakers", and degassing units or so-called "degassers". Apparatuses and systems that are arranged for separating at least some solids from fluids, are known from US patent applications US2002/0000399 and US 2005/0006149, from European Patent EP 652810, from the Norwegian patents No. 308649, No. 303323 and No. 319329, from Norwegian patent application No. 20110775 and from Canadian patent application CA 2445067.

A shaker generates a shaking motion typically in two planes; one reciprocating movement, and an up-and-down movement, so that the sieving cloth of the shaker exhibit for example an elliptical or circular path. The shaking motion is produced by means of a shaker motor, which may be connected to an offset clump weight.

The present applicant has developed a device for sieving and fluid separation of a material containing fractions of a solid and a fluid, the material being placed on an upper side of at least one sieving element including an endless sieving cloth arranged to be moved around at least two spaced-apart turning-rollers, wherein the apparatus includes at least one suction nozzle which is located proximate an underside of the endless sieving cloth for the generation of a fluid flow through at least a portion of the material present on the endless sieving cloth, the suction nozzle being connected with a fluid-tight vessel which is evacuated using at least one vacuum pump, the gas phase of the fluid being arranged to be separated from the liquid phase of the fluid in the vessel, and the gas phase of the fluid and the liquid phase of the fluid being evacuated separately from said vessel. The apparatus has been thoroughly described in Norwegian patent No. 323519.

Although the apparatus according to No. 323519 has many advantageous features as compared with those of conventional shakers, and consequently has attracted great interest in the market, by far most sieving apparatuses that currently are utilized for cleaning drilling mud are constituted by suchlike traditional shakers. This is because shakers until recently have almost controlled the market because of being the only possible alternative.

Surprisingly, it has been found that a shaker, of a kind that is known per se, may be considerably improved by combining this with the features of the apparatus according to No. 323519, and that the present invention also may represent further advantages as compared with those that are known from No. 323519.

The object of the invention is to remedy or to reduce at least one of the disadvantages of the prior art, or at least to provide a useful alternative to the prior art.

This object is achieved by the features specified in the description below and in the patent claims that follows.

According to a first aspect of the present invention, there is provided a sieving apparatus of the kind being arranged for separating solid particles above a predetermined size from a fluid, in that the solids-containing fluid is carried across at least one sieving-cloth being arranged in a frame connected to a shaking device for providing a shaking motion, the sieving apparatus comprising:

an inlet portion for receiving solids-containing fluid;

a discharge portion for solids that have been carried across the at least one sieving cloth and an outlet portion for fluid that has passed through the sieving cloth, wherein the sieving apparatus further comprises:

at least one endless sieving cloth arranged for rotating around at least two spaced-apart turning-rollers, of which at least one is connected to a motor; and a pumping device in fluid communication with a suction nozzle which is located proximate an underside of the endless sieving cloth between two of the turning—rollers, in order to provide a fluid flow through at least a portion of the endless sieving cloth.

From the foregoing, it will be appreciated that separation of the solid particles from the fluid is provided in consequence of the gravitational forces, or g-forces, which is generated by means of the shaker device, and by the fluid flow which, by means of the pumping device and the suction nozzle, passes between the particles located on the endless sieving cloth. This has the effect that at least a portion of the liquid, which is bound to the solid particles due to adhesion forces, is more easily torn away by means of the g-forces, while at the same time fluid in the gaseous form and liquid form is extracted from the solids-containing fluid by means of said fluid flow.

A skilled person will know that gas, vapour or mist occurring in connection with cleaning of drilling mud, may represent major challenges related to health and safety for personnel being near to the sieving apparatus. In order to at least reduce these challenges, it is therefore an advantage if the exhaust side of the pumping device is connected to a fluid conduit that carries the gases away at least from the working area, for cleaning or for disposal. The need for ventilation in the area surrounding the sieving apparatus will thereby be reduced, with correspondingly reduced noise.

If the sieving apparatus in addition is provided with an enclosure that, with the exception of a required air supply portion, is substantially fluid tight, said gas, vapour and mist will be lead through the suction nozzle and away from the apparatus. The air supply portion may for example be through the supply portion and/or through the discharge edge. Because of the enclosure the amount of fluid being sucked out from the apparatus through the suction nozzle, must be compensated by air being drawn in through said air supply portion. Gas, vapour and mist will thus relatively quickly be sucked towards and out through the suction nozzle. This, in turn, may provide a good visibility at the inside of the enclosure. With a good visibility and with possibly an additional light source, a camera may be used to remotely monitor the sieving process and, for example, the condition of the sieving cloths in the apparatus. Thus, personnel may be protected from exposure to possible harmful gases present in the sieving process.

To separate the fluid being sucked through the suction nozzle in a liquid phase and a gaseous phase, a separation device may be arranged downstream of the suction device, for example between an outlet portion of the suction device, and an inlet portion of the pumping device. Such a separation device may be of a kind known per se, and will therefore not be discussed any further.

In the petroleum industry, a significant part of the hitherto known reservoirs being referred to as "easily accessible" hydrocarbons, has already been exploited. Partly as a consequence of reservoirs now being located deeper into the ground, the solids-containing fluid that is produced from the well may have a relatively high temperature, for example above 70° C.

A skilled person will know that one of the objects of the drilling fluid, or the so-called "mud", is to cool the drill bit. If a high temperature drilling fluid being returned from the sieving apparatus is pumped into the well, the cooling effect from the drilling fluid will be reduced. It is therefore desirable that the drilling fluid that is pumped down into the well undergoes a certain cooling before it is returned to the well.

Experiments have shown that the fluid flow, which by means of the pumping device is sucked through the endless sieving cloth, has a cooling effect on the solids-containing fluid that is exposed to the fluid flow.

The at least one endless sieving cloth may be arranged at the discharge edge of the sieving apparatus, that is to say in the extension of the at least one sieving cloth which has been arranged in a frame connected to the shaker device.

Such a solution be suitable for improving existing shakers without extensive modifications.

The sieving cloth that has been arranged in the frame will, in the following, even though it typically will be exposed to some reciprocating movements and an up—and—down movement, also be referred to as a "stationary sieving cloth". A stationary sieving cloth may comprise a multiple of panels arranged in series. One of the advantages of dividing the cloth into panels is that only a section of the stationary sieving cloth needs to be replaced when damage occurs.

Alternatively to arranging the endless sieving cloth downstream of the stationary sieving cloth, the endless sieving cloth may be arranged upstream of the stationary sieving cloth, between the inlet portion of the sieving apparatus and the stationary sieving cloth. Although such a solution would require a more extensive modification of an existing shaker, it has some advantageous features.

Experiments show that the cleaning effect of the endless sieving cloth will, by far, exceed the cleaning effect of the stationary sieving cloth. By arranging the endless sieving cloth upstream of the stationary sieving cloth, the latter will receive a relatively "dry" solid. However, the gravitational forces produced by the shaking motion may exceed the adhesion forces that bind liquid to the solid particles, and hence facilitate further recovery of valuable drilling fluids.

In one embodiment the sieving apparatus is provided with an endless sieving cloth both upstream and downstream of the stationary sieving cloth.

The at least one endless sieving cloth may be arranged substantially in series with the stationary sieving cloth.

As an alternative to or as an addition to said series configuration, the endless sieving cloth may be arranged above at least a portion of the at least one sieving cloth that has been placed in the frame. The inlet portion of the sieving apparatus will then be in connection with the endless sieving cloth, so that the solids-containing fluid is supplied to the sieving apparatus via the endless sieving cloth.

Such a parallel configuration has inter alia the advantageous feature that the so-called "footprint" of the sieving apparatus, which is a critical factor on board a drilling rig having a limited available area, may be reduced. Such a reduced footprint may be achieved by supplying the solids-containing fluid to an endless sieving cloth that has been arranged above the stationary sieving cloth, and rotate the sieving cloth so that the material is carried to an upstream end of an underlying, stationary sieving cloth, possibly via an additional endless sieving cloth arranged in series with the said stationary sieving cloth.

In one embodiment of a parallel configuration, a longitudinal axis of the turning-rollers extend substantially in parallel with a longitudinal axis of the sieving apparatus. This provides an opportunity to control where on the stationary sieving cloth material shall be supplied. By providing an alternating rotation in both directions for the endless sieving cloth, the stationary sieving cloth may receive the material falling off the endless sieving cloth, in "furrows". Such furrows show to possess a beneficial effect on the lifetime of the panels, probably because the panels receive the material over a larger area than is the case when introducing the material at just one area of the stationary sieving cloth.

In one embodiment of a parallel configuration, a longitudinal axis of the turning-rollers extend substantially perpendicular to a longitudinal axis of the sieving apparatus.

The endless sieving cloth may be arranged at the inlet portion and arranged for selectively rejecting unwanted solids that may be carried in the solids-containing fluid by being set in rotation in such a direction that the solids-containing fluid is carried away from the subsequent stationary sieving cloth and out of the sieving apparatus.

By controlling the rotational direction of the motor that has been connected to at least one of the turning-rollers, the endless sieving cloth is controlled to be set in motion around the turning-rollers in one or the other direction. In one embodiment of the invention this is being used to control whether the solids-containing fluid shall be conducted further on to the stationary sieving cloth, or whether the fluid shall be carried out of the sieving apparatus already at the inlet portion of the sieving apparatus.

The advantage of such a sorting is that the unwanted material that is introduced from the well may be removed before being carried further into the sieving apparatus and on to the stationary sieving cloth. Such an unwanted material may typically be metal shavings being brought up from the well, for example in connection with drilling of a lateral wellbore where it is necessary to drill through a casing wall.

Because of the relative motion that occurs between the supplied material and the stationary sieving cloth as a result of the shaking motion this is subjected to, such metal shavings may quickly damage the sieving cloth. By being able to guide the unwanted material away from the sieving apparatus by means of the endless sieving cloth, such damage of the stationary sieving cloth can be avoided.

Hence, a first sieving cloth which is arranged for separating solid particles above a predetermined size from a solids-containing fluid, may be used as a rejecting device to prevent any undesired material from passing on to a subsequent second sieving cloth, which is also arranged for separating solid particles above a predetermined size from a solids-containing fluid.

In a second aspect of the present invention, there is provided a method for separating solid particles above a predetermined size from a solids-containing-fluid, wherein the method comprises passing the solids-containing fluid through a sieving apparatus provided with at least two sieving cloths, and wherein the apparatus comprises: an inlet portion for receiving the solids-containing fluid; a discharge portion for solids that is retained on the sieving cloths, and an outlet portion for fluid that has passed through the sieving cloths, the method comprises carrying the solids-containing fluid across at least one sieving cloth which is arranged in a frame connected to a shaking device for providing a shaking motion so as to provide a relative movement between the sieving cloth and the solids-containing fluid, and over an endless sieving cloth arranged for rotating around at least two spaced-apart turning-rollers, wherein the solid particles in the solids-containing fluid is carried substantially without being moved relative to the sieving cloth, but where a portion of the fluid is separated from the solid particles by means of a pumping device being in fluid communication with a suction nozzle which is located proximate an underside of the endless sieving cloth between two of the turning-rollers, in order to provide a fluid flow through at least a portion of the material that is present on the endless sieving cloth.

Additional features of the method will be evident from features in the first aspect of the invention, and in the description that follows, as well as in claims 9 to 11.

As a consequence of the cleaning efficiency of the endless sieving cloth far exceeds the cleaning efficiency of the stationary sieving cloth, this may be utilized to configure the sieving apparatus in such a manner that the stationary sieving cloth will be exposed to a minimum abrasion from the solid particles being supplied thereon. This can be achieved by arranging the stationary sieving cloth with an inclination downwards, from the receiving portion and the discharge edge. By such an inclination it may be sufficient with a reciprocating movement only of the stationary sieving cloth rather than, for example, an elliptical movement path which produces both a reciprocating movement and an up-and-down movement. Hence, the movement does not have to be produced by means of, for example, an offset clump weight that is commonly being used in shakers of the prior art. Thus, the shaker device may be of a kind that is simpler, with movement in one single plane. Hence, there is provided a more gentle motion of the solid particles across the stationary sieving cloth, with a prolonged lifetime of the sieving cloth as a result, while at the same time vibrations against the structure that carries the sieving apparatus, and noise from the sieving process, are substantially reduced.

As an alternative to, or in addition to said single-plane shaker device, experiments have shown that a movement of the solid particles across the stationary sieving cloth may be produced by micro-vibrations from an oscillating device, for example of the kind that inter alia has been described in the present applicant's patents No. 326594 and No. 323519. Such micro-vibrations will produce very small movements between the solid material and the sieving cloth that carries it. Along with the inclined cloth, the micro-vibrations will produce a movement of material from a supply portion and to the discharge edge of the sieving cloth. Additionally, the micro-vibrations will facilitate separation of liquid from the solid particles, and thus improve the sieving efficiency of the stationary sieving cloth.

As an alternative to the above downwards inclination from a supply portion to the discharge edge, the stationary sieving cloth could be arranged so that the supply portion has a lower elevation than the discharge edge. That is, the material is brought across the stationary sieving cloth in an uphill fashion. To bring the supplied material across the sieving cloth, such a solution would require that the sieving cloth must be subject to a reciprocating movement and an up-and-down movement, for example an elliptical path of movement where the rotation is in a direction from the supply portion to the discharge edge. The advantage of such a configuration is that the movement of material across the stationary sieving cloth is somewhat counteracted by the gravitational forces, so that the residence time on the stationary sieving cloth will be increased. A prolonged residence time may result in an improved separation of liquid from the solid particles. The prolonged residence time may be used to reduce the longitudinal extent of the sieving apparatus and consequently reduce the "footprint" of sieving apparatus, which may be a critical factor for example on board a rig.

In what follows, an example of a preferred embodiment has been described, and has been illustrated in the attached drawings, wherein:

FIG. 3a shows a side view of an apparatus resembling the apparatus shown in FIG. 1a;

FIG. 3b shows a top view of the apparatus shown in FIG. 3a;

FIG. 4a shows an alternative embodiment of the apparatus shown in FIG. 3a;

FIG. 4b shows a top view of the apparatus shown in FIG. 4a;

FIG. 5a shows a further alternative embodiment of the apparatus shown in FIGS. 3a and 4a;

FIG. 5b shows a top view of the apparatus shown in FIG. 5a;

Figure 6A:
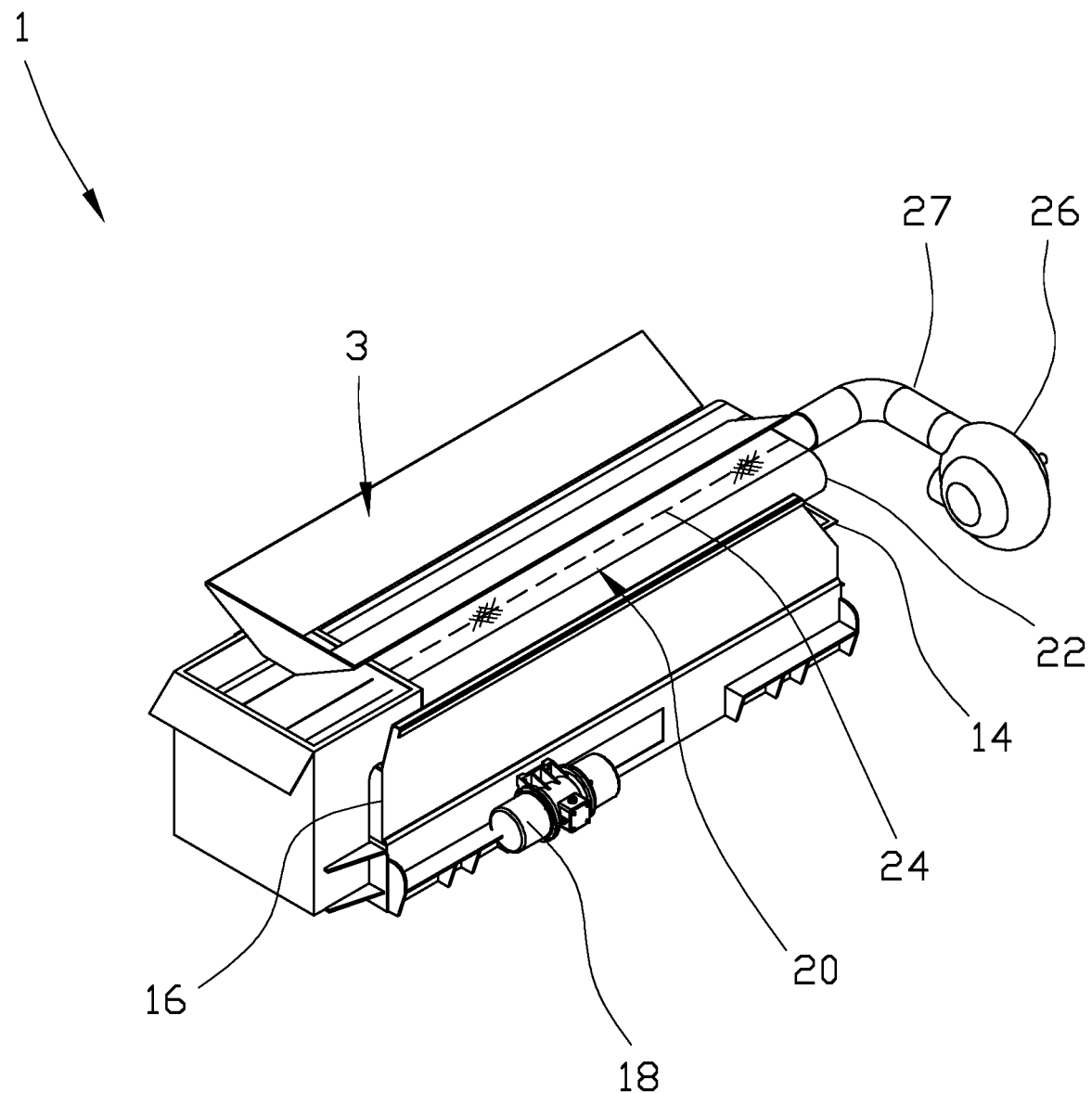
Figure 6B:
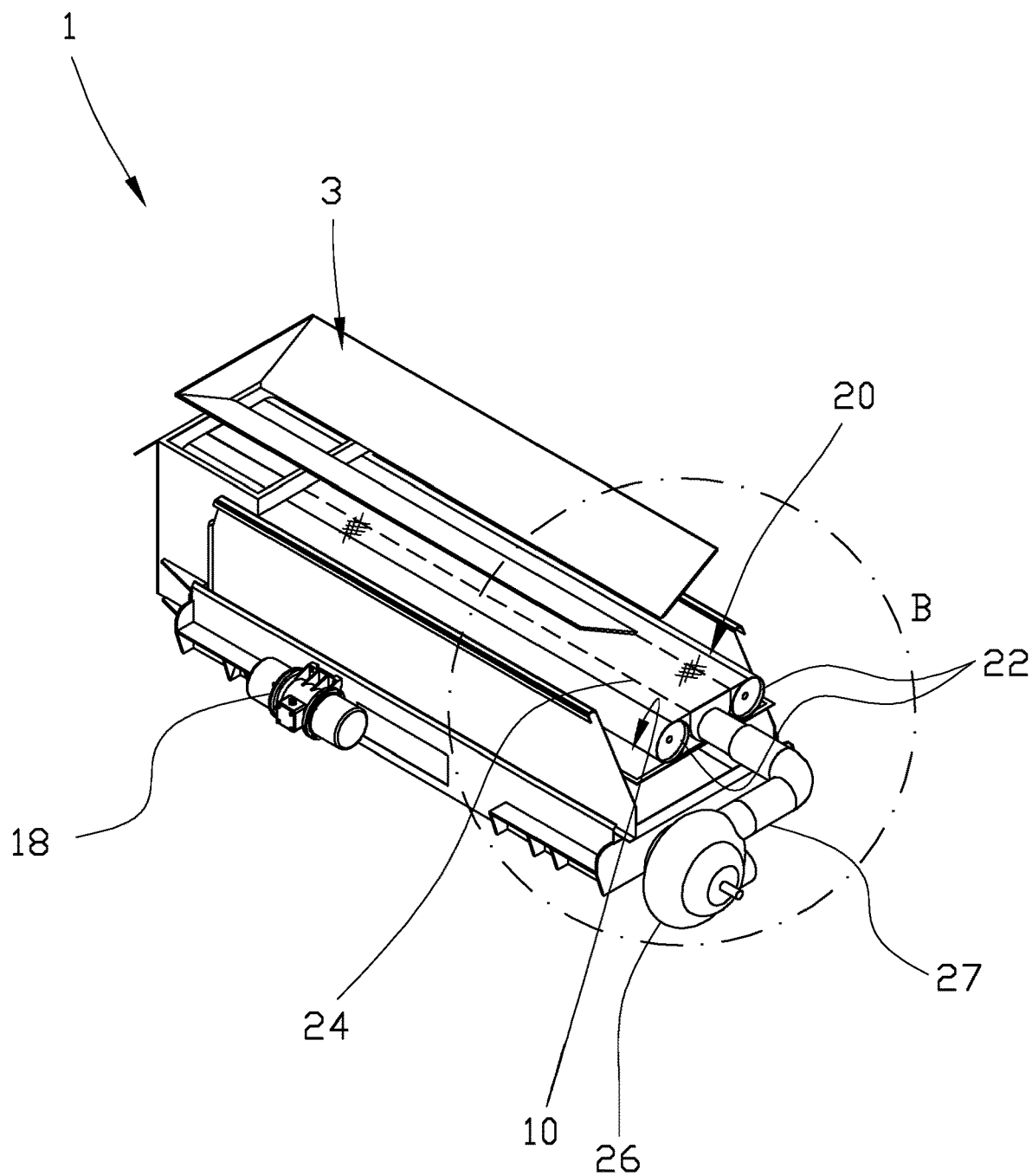
Figure 6C:
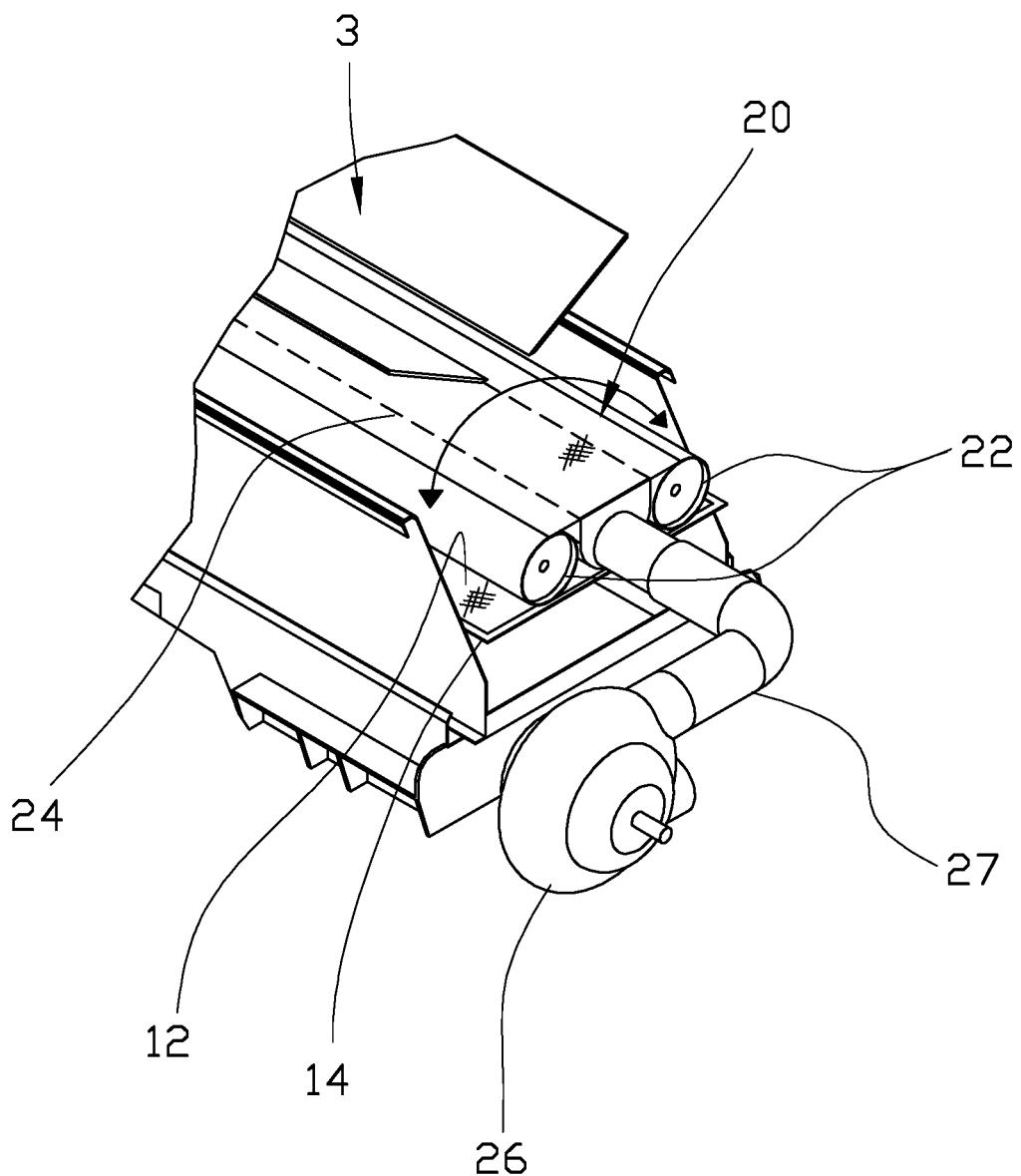

FIGS. 6*a* and 6*b* show a perspective view of a further alternative embodiment of the apparatus shown in the preceding figures;

FIG. 6*c* shown in a larger scale detail B in FIG. 6*b;*

Figure 7A:
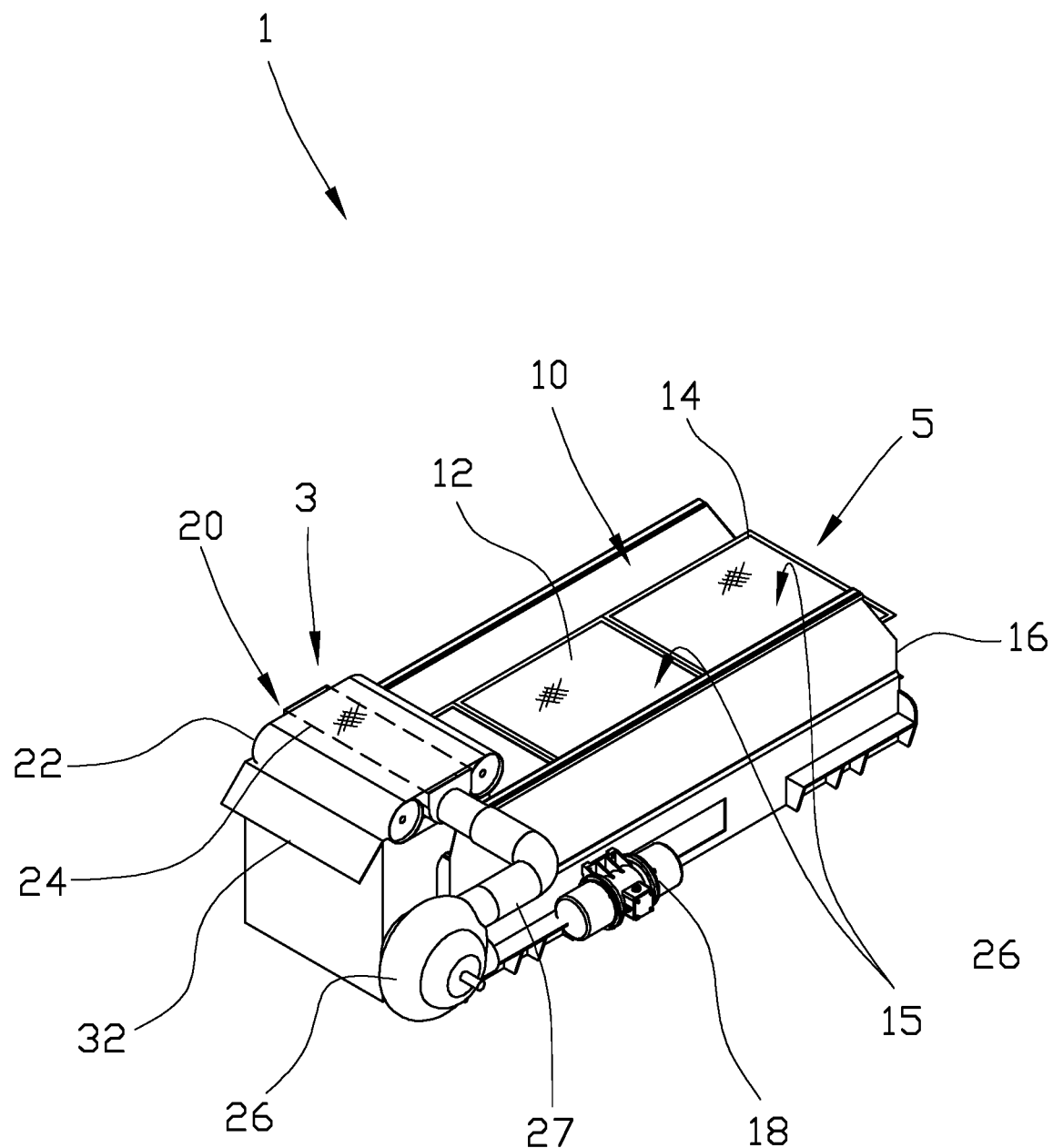
Figure 7B:
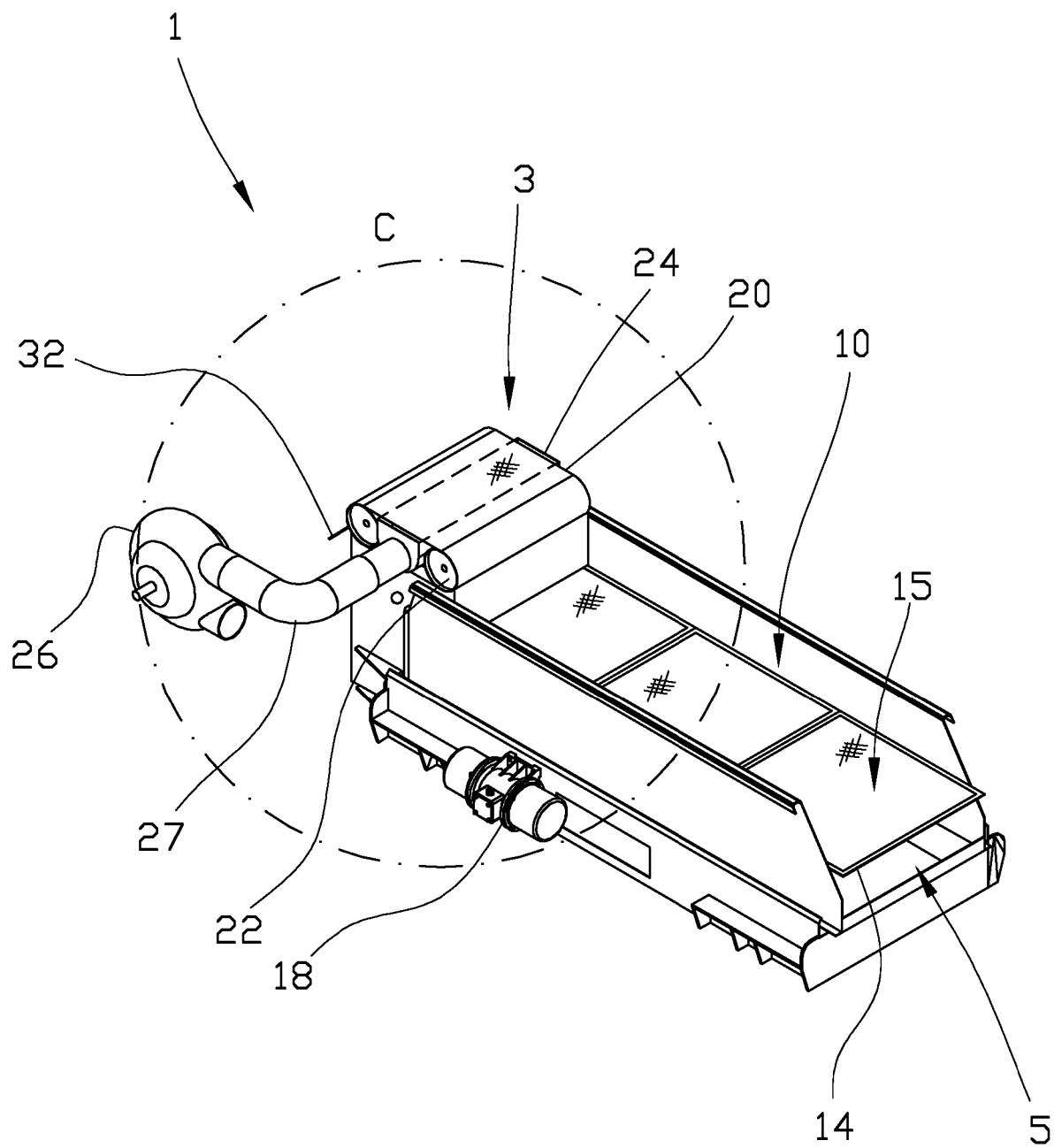
Figure 7C:
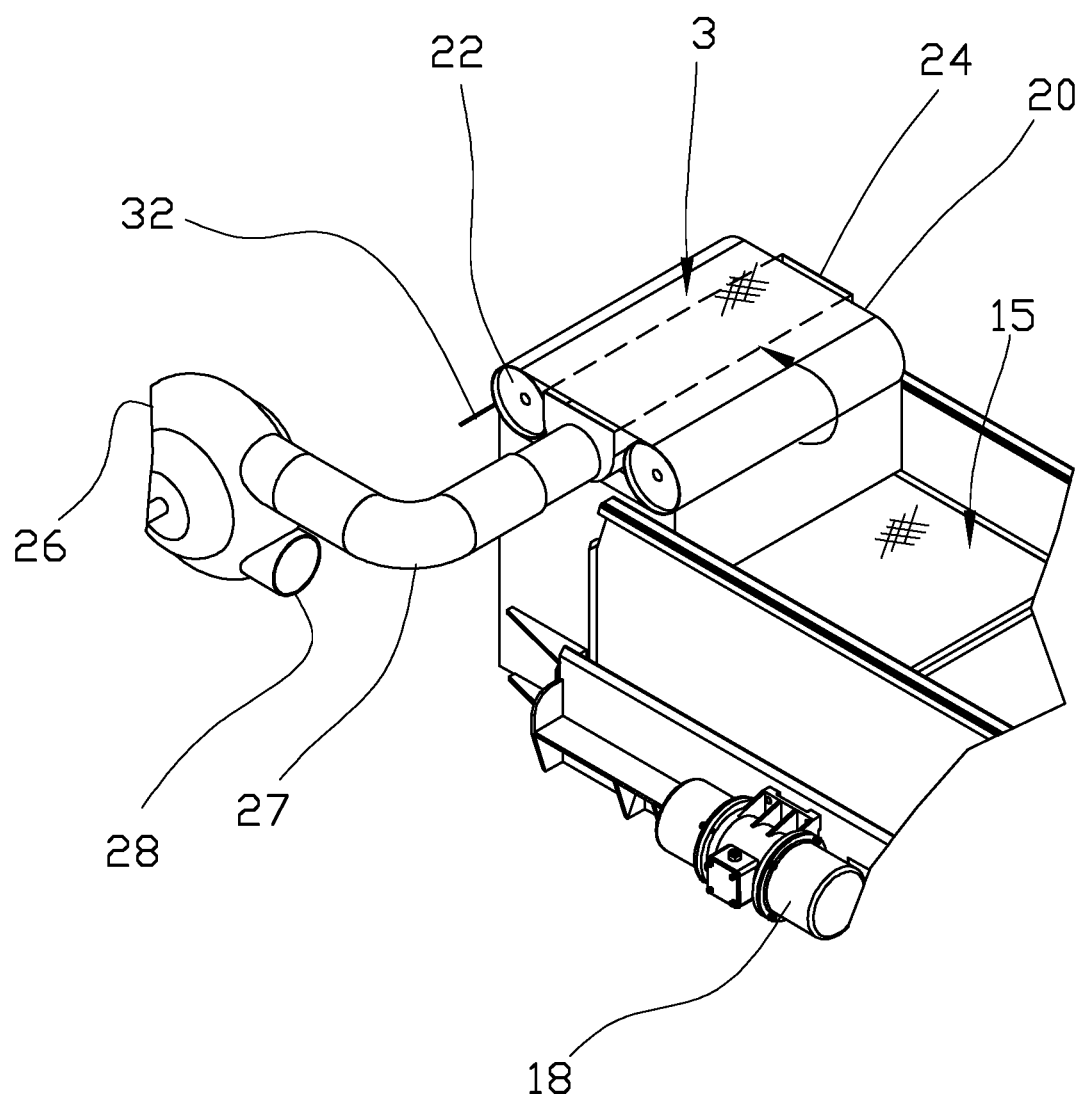

FIGS. 7*a* and 7*b* show a perspective view of a still further alternative embodiment of the apparatus shown in the preceding figures; and FIG. 7*c* shows in a larger scale detail C in FIG. 7*b.*

Positional indications, such as "above", "below", "right" and "left" hereinafter refer to the positions shown in the figures.

Same or similar elements are indicated with the same reference numerals in the figures. For clarity, not all elements are indicated with reference numerals in all the figures, and some elements are shown, but are not discussed any further in the following description. These are elements that will be obvious for the skilled person and/or will have no significance for functioning of the invention.

In the figures, the reference numeral 1 indicates a sieving apparatus having an inlet portion 3 and a discharge edge 5 arranged at a distance from the inlet portion 3.

A stationary sieving cloth 10 and an endless sieving cloth 20 are arranged between the inlet portion 3 and the discharge edge 5.

In the illustrated embodiment, the stationary sieving cloth 10 comprises three sieving cloth elements 12, each of which being attached to an appertaining sieving cloth frame 14. The sieving cloth elements 12 and the sieving cloth frame 14 will hereinafter be termed a panel 15. The panels 15 are secured to a frame 16. The frame 16 is connected to a shaking device, which hereinafter also will be referred to as a shaker motor 18. The shaker motor 18 is, in a manner known per se, arranged to be set in motion so that the frame 16 will be subject to both an up-and-down movement and a reciprocating movement, as will be known from a shaker of a kind known per se. However, the shaker motor 18 could be arranged to provide only a reciprocating movement for the frame 16, and may possibly be replaced by an oscillating device that produces a micro movement.

The frame 16 is movably attached to a base. In the embodiment shown, the panel 15 which is located closest to the inlet portion 3 may have a larger up-and-down movement than the panel 15 which is located at the discharge edge 5.

In the shown embodiment, the stationary sieving cloth 10 has a higher elevation at the inlet portion 3 than at the discharge edge 5. Because of the shaking motion from the shaker motor 18, or possibly from the micro-vibrations of an oscillating device, and said height difference, the materials supplied to the stationary sieving cloth 10 will move across the panels 15 and pass the discharge edge 5. The material may be supplied to the stationary sieving cloth 10 directly from a source, or via the endless sieving cloth 20, as will be explained in the following for some of the embodiments of the present invention.

In an alternative embodiment (not shown), the stationary sieving cloth 10 has a lower elevation at the inlet portion 3 than at the discharge edge 5, as explained in the general part of the application.

From an isolated point of view, the stationary sieving cloth 10 may therefore be of a kind known per se.

Each of the at least one endless sieving cloth 20 is tensioned between two spaced apart turning-rollers 22. Each of the turning-rollers 22 is rotatably supported in a carrier device not shown. One or both of the turning-rollers 22 is connected to a driving device in the form of a motor not shown, being arranged to set the turning-roller in rotation, as will be known from the applicant's No. 323519.

To prevent the supplied material from falling off the side edges of the endless sieving cloth 20, between the turning-rollers 22, a guiding edge (not shown) may be arranged in conjunction with a frame carrying the turning-rollers 22.

A suction table or suction nozzle 24 in the form of a trough-shaped body is arranged between the turning-rollers 20. The open portion of the suction nozzle 24 faces towards an underside of an upper portion of the endless sieving cloth 20.

A pump inlet portion 25 of a pumping device 26 is, by means of a pipe 27, in fluid communication with the suction nozzle 24, so that the pumping device 26 may evacuate fluid from the suction nozzle 24 and thus generate a fluid flow through the sieving cloth 20 located above the open portion of the suction nozzle 24, and thus also through any supplied material that may be carried by the sieving cloth 20.

The pumping device 26 is further provided with a pump outlet portion 28. The pump outlet portion 28 may be connected to an exhaust pipe not shown, which may be in communication with a cleaning apparatus, or which may have an outlet at a distance from the sieving apparatus 1.

Figure 1A:
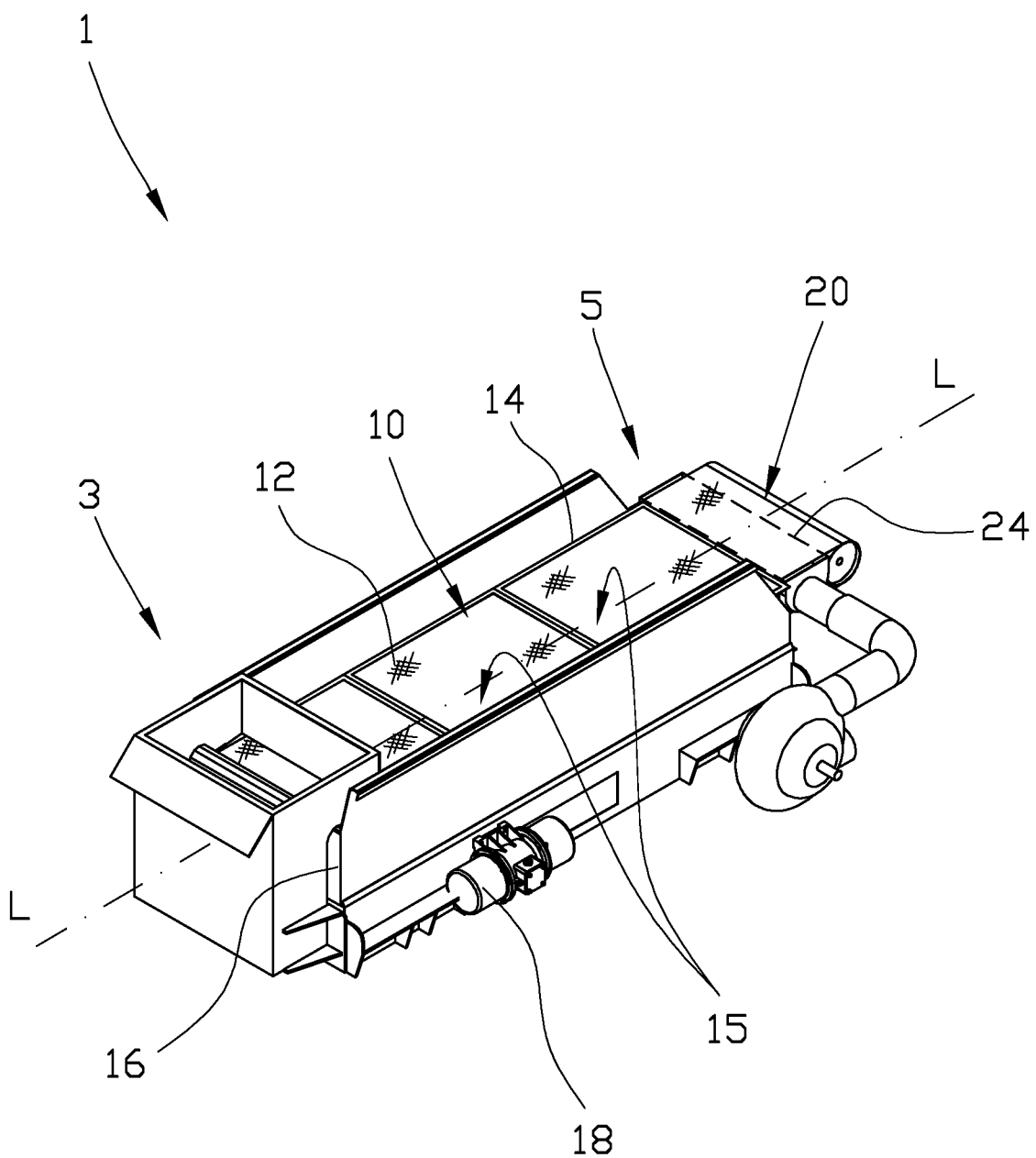
FIGS. 1a and 1b show a perspective view of a sieving apparatus of the present invention.

In FIG. 1*a*, the endless sieving cloth 20 is arranged at the discharge edge 5 of the sieving apparatus 1. Solids-containing fluid is supplied to the stationary sieving cloth 10 from the inlet portion 3 and will, because of the shaking motion from the shaker motor 18, be moved across the serially arranged panels 15 and transferred onto the endless sieving cloth 20. The endless sieving cloth 20 may be attached to the frame 16, so that also the endless sieving cloth 20 is subject to a vibration. Alternatively, the endless sieving cloth 20 may be attached to the base of the sieving apparatus 1, and hence be subject to a limited vibration only. The base may, for example, be a floor on a rig. It may also be conceivable that the endless sieving cloth 20 being arranged independent from that part of the sieving apparatus 1 comprising the stationary sieving cloth 10. For example, the stationary sieving cloth 10 may be arranged on a separate base (not shown).

When the supplied material moves across the stationary sieving cloth 10, a separation of liquid from solid particles above a predetermined size will be produced by means of gravitational forces being enhanced by the shaking motion. When the material is carried over the endless sieving cloth 20, the separation of liquid and gas from the solid particles will substantially occur as a result of the air flow generated by the pumping device 26.

Figure 1B:
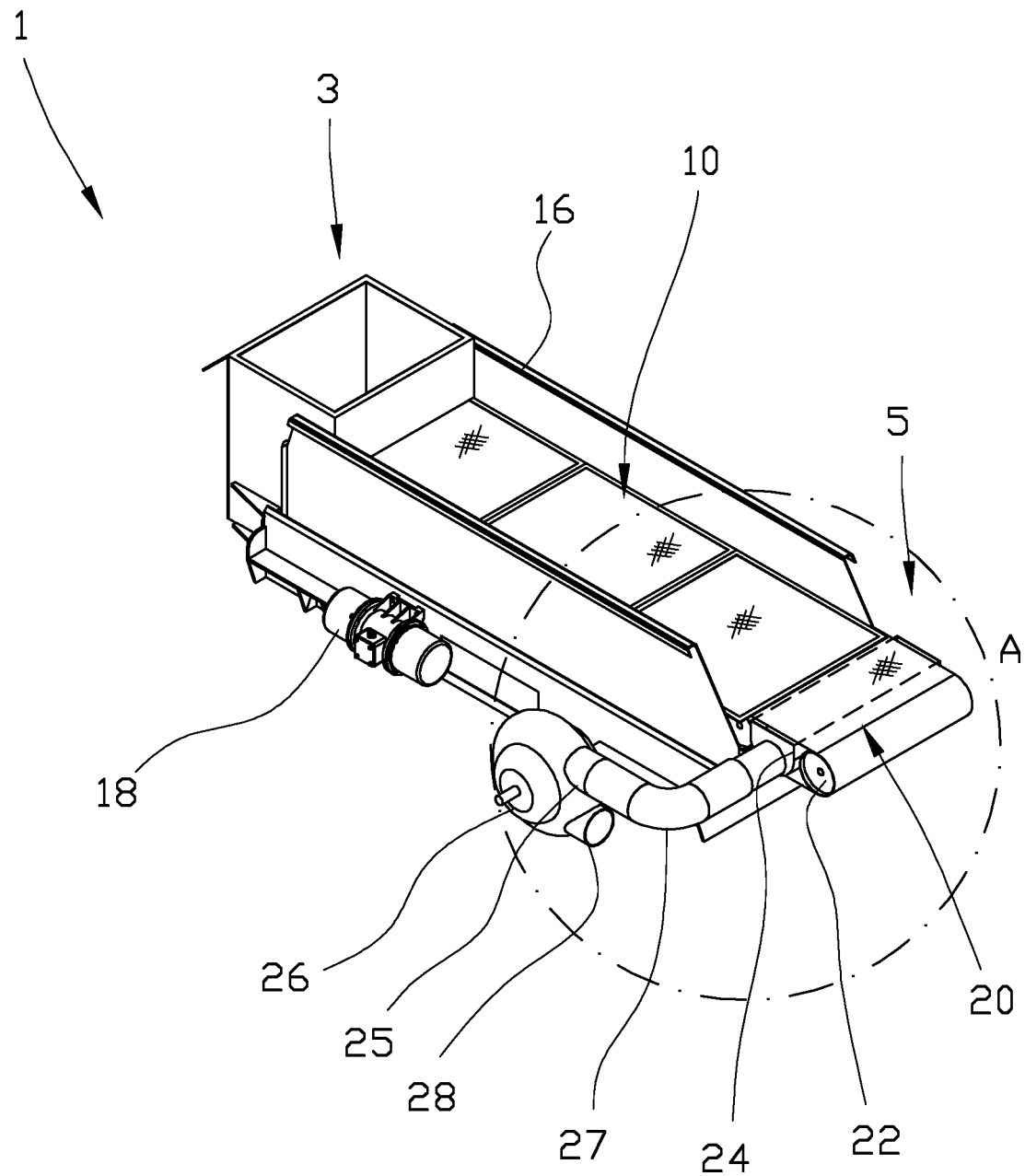
Figure 1C:
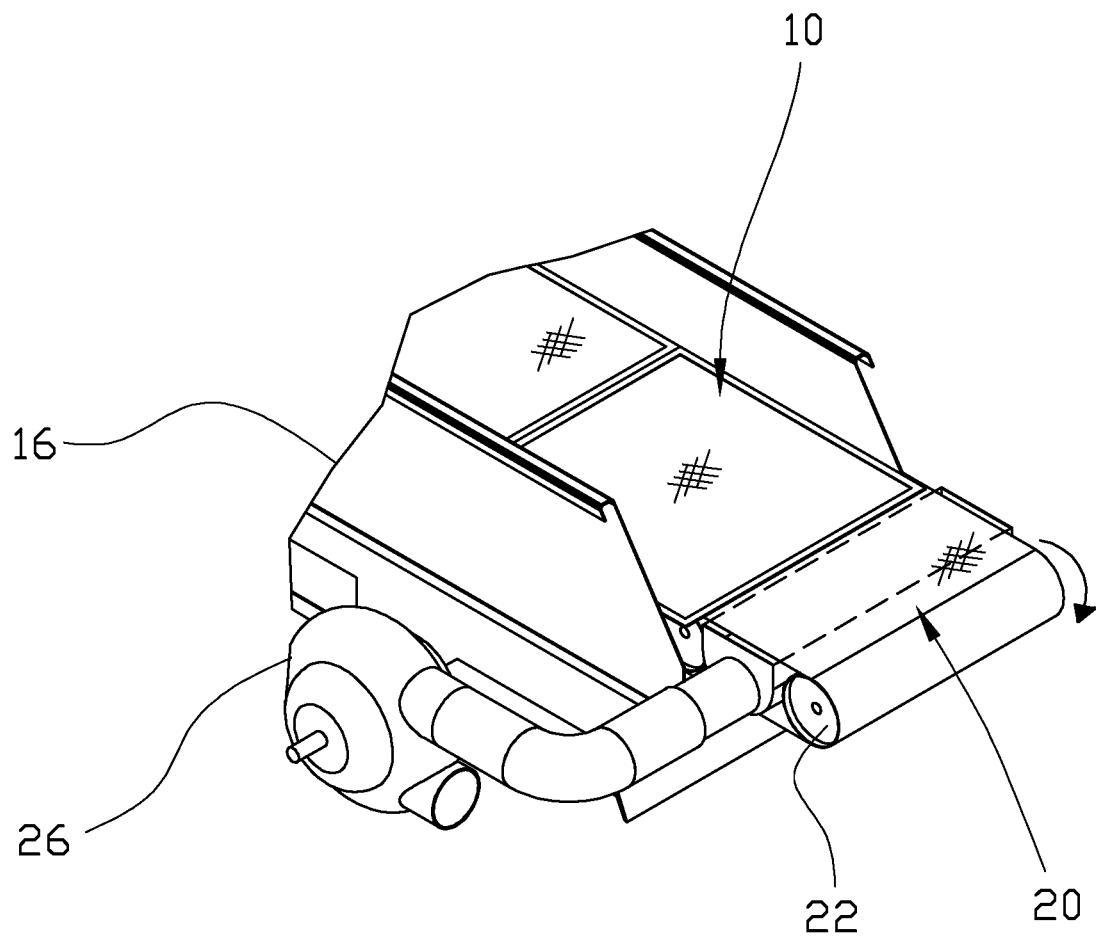
FIG. 1c shows in a larger scale detail A in FIG. 1b.

In FIGS. 1*a*, 1*b* and 1*c*, a portion of the stationary sieving cloth 10 overlaps a portion of the endless sieving cloth 20, so that material falling off from the former will be transferred onto the endless sieving cloth 20 and will be "carried" over the suction nozzle 24 and over the turning-roller 22, before the material discharges from the endless sieving cloth 20. In FIG. 1*c*, the movement direction for the endless sieving cloth 20 has been shown with an arrow.

Figure 2:
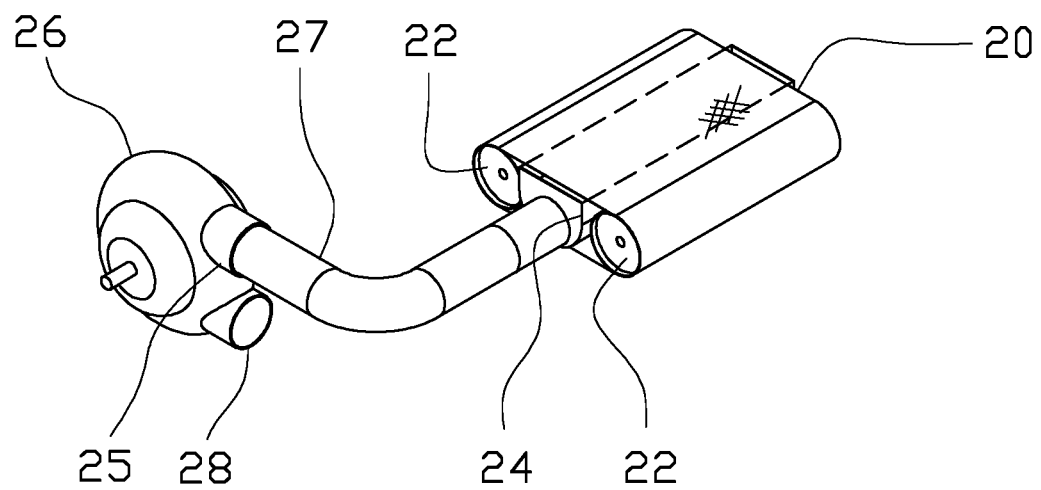
FIG. 2 shows, in perspective, a view of an endless sieving cloth included in the sieving apparatus shown in FIG. 1c, where the endless sieving cloth is attached to a pumping device via a suction nozzle.

FIG. 2 shows the endless sieving cloth 20, the suction nozzle 24 and the pumping device 26, seen isolated from the rest of the sieving apparatus 1 shown in FIGS. 1*b* and 1*c*.

Figure 3A:
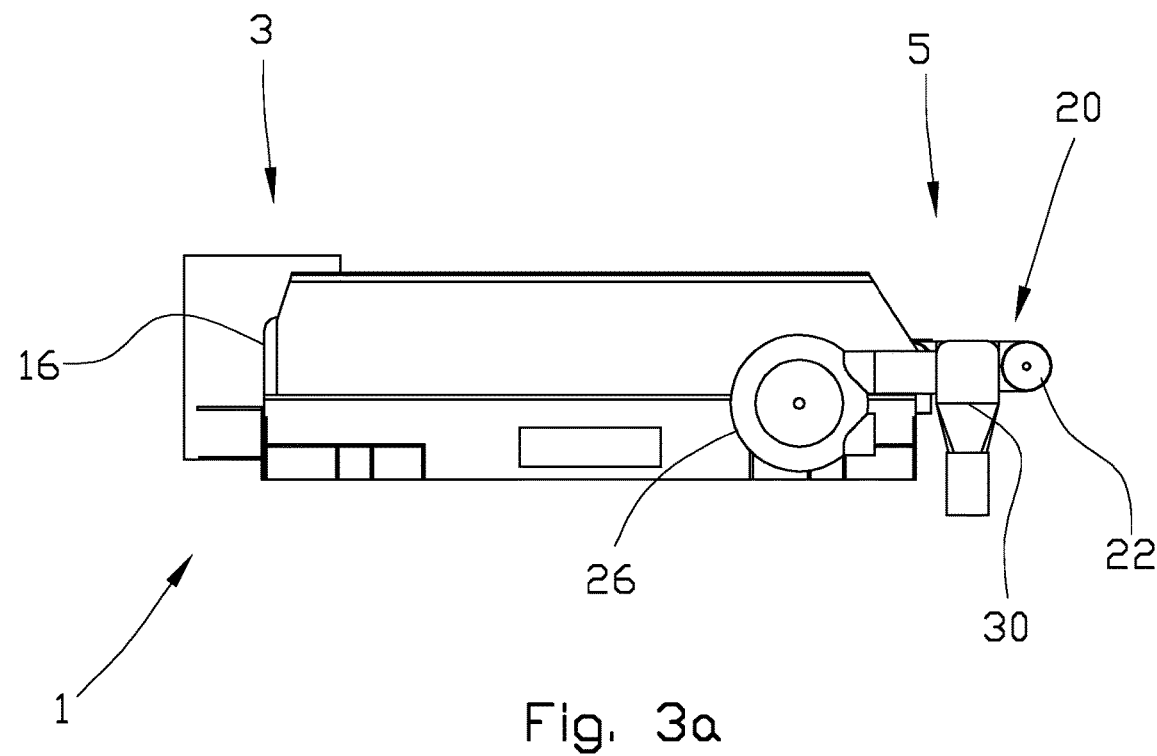
Figure 3B:
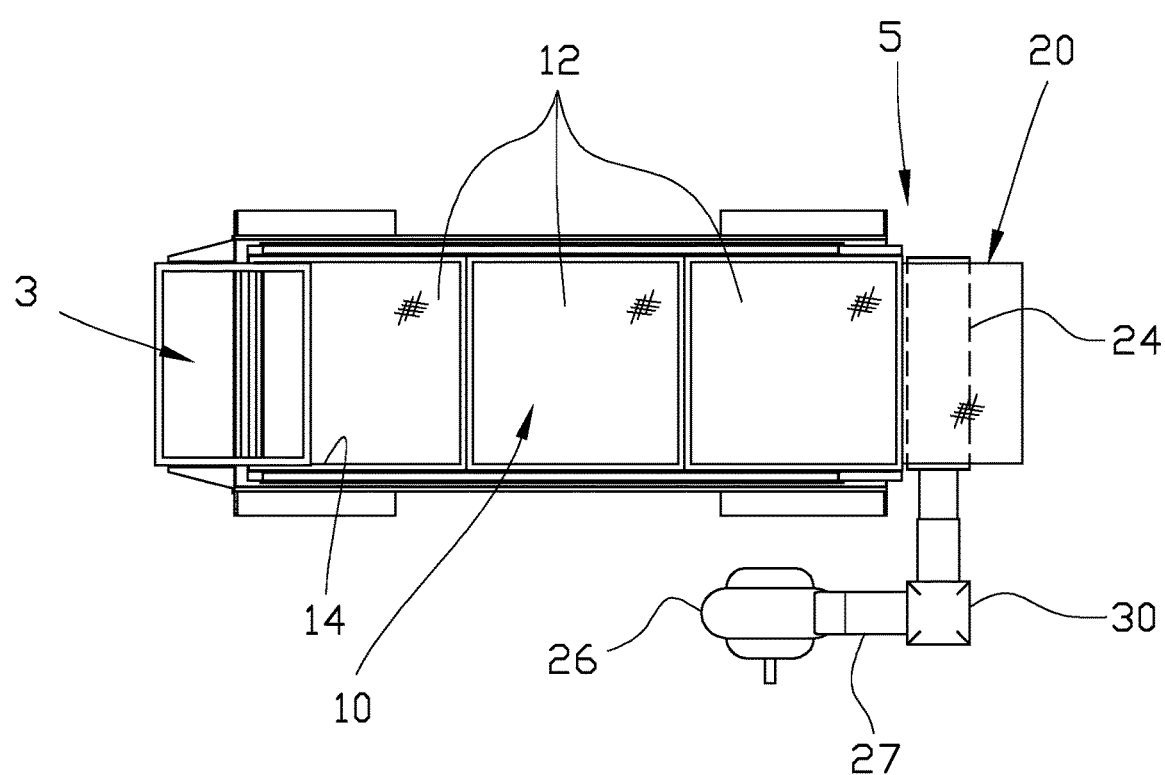

In FIGS. 3*a* and 3*b*, the apparatus of FIG. 1*a* is shown from the side and from above, respectively, but where the pipe 27 between the suction nozzle 24 and the pumping device 26 is further provided with a liquid/gas separator 30. The liquid/gas separator 30 will hereinafter also be referred to as a fluid separator 30. For the sake of simplicity, the shaker motor has not been shown in those figures where the apparatus is shown in views from above and from the side.

By means of the fluid separator 30, at least a portion of the liquid fraction of the fluid is separated from the gas fraction of the fluid so that the liquid fraction, for example the drilling fluid, may be mixed with the liquid fraction which has passed the stationary sieving cloth 10, and then be pumped down into the well in a manner known per se, by using a so-called mud pump. As mentioned, the gas fraction may be passed further on through the pumping device 26 and then away from the sieving apparatus 1.

Figure 4A:
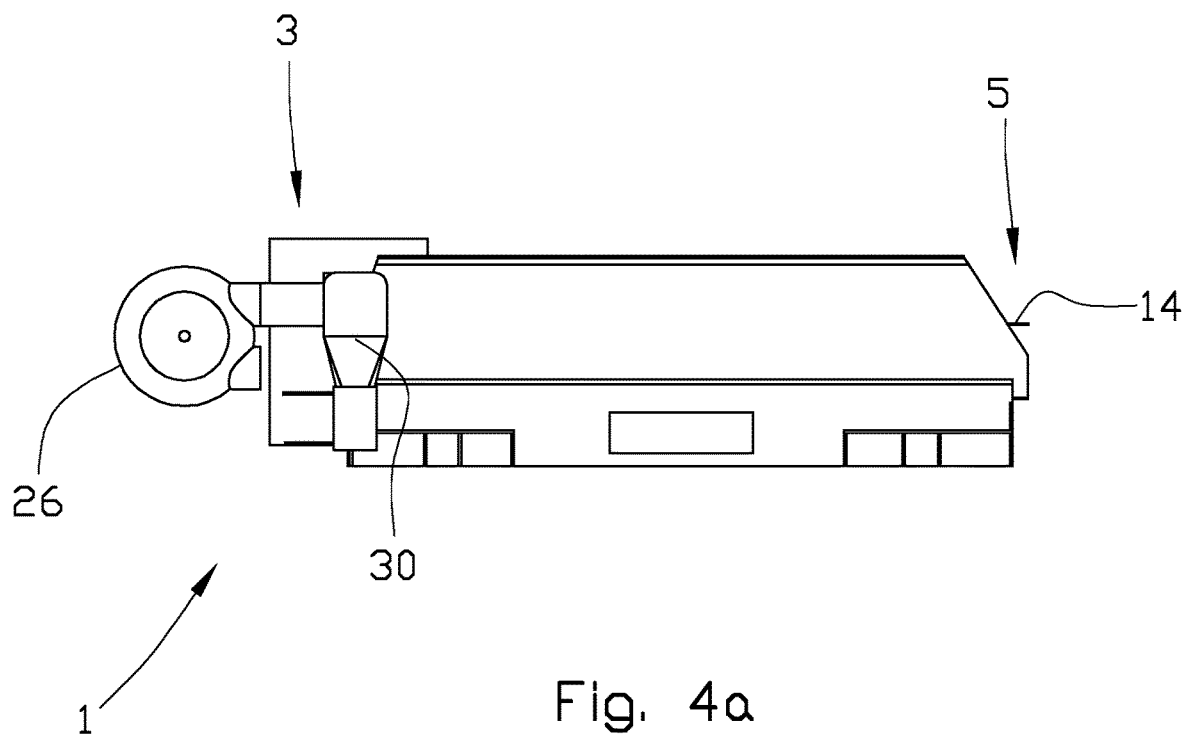
Figure 4B:
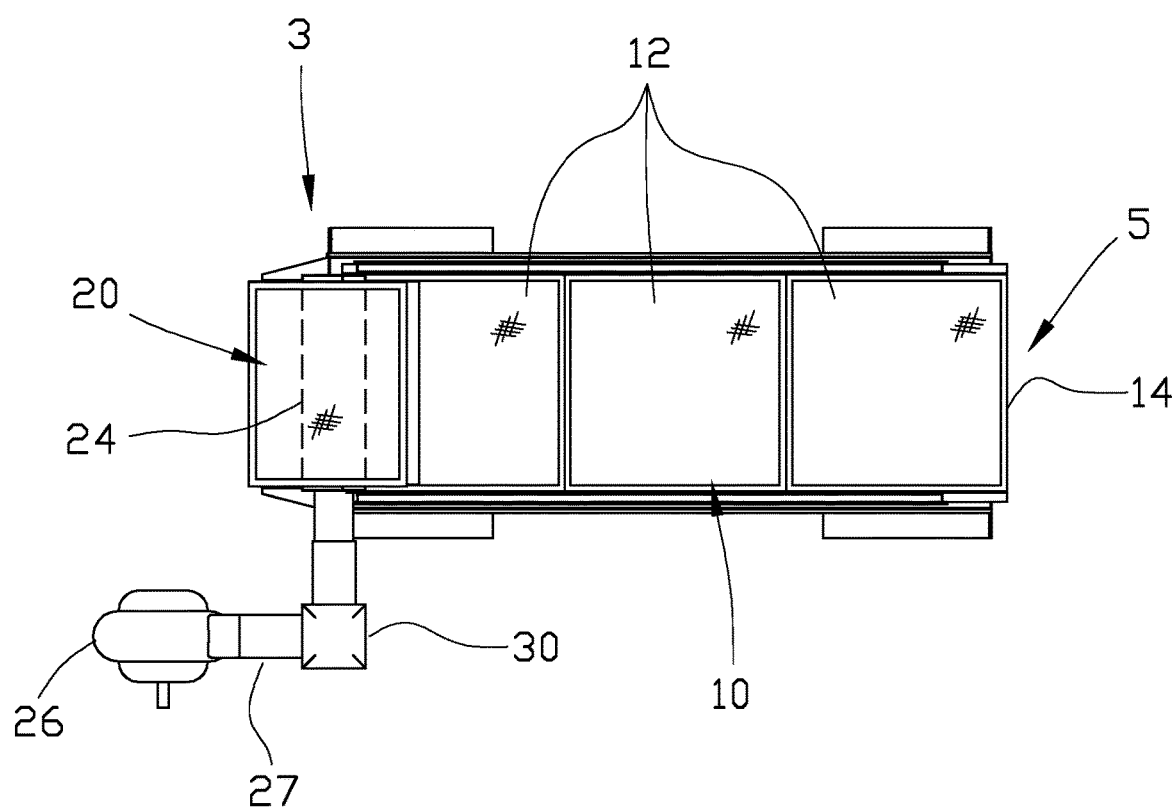

In FIGS. 4a and 4b, an alternative embodiment of the sieving apparatus according to the present invention is shown, wherein the endless sieving cloth 20 is arranged at the inlet portion 3 of the sieving apparatus 1, i.e. upstream of the stationary sieving cloth 10.

Figure 5A:
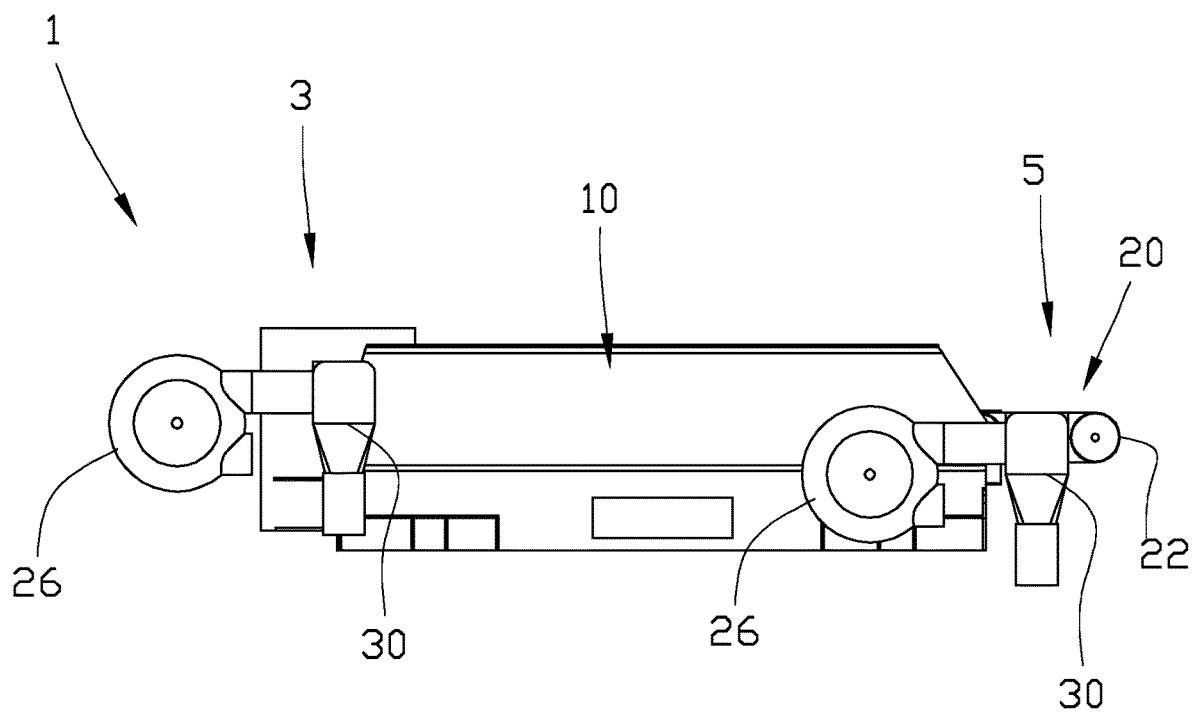
Figure 5B:
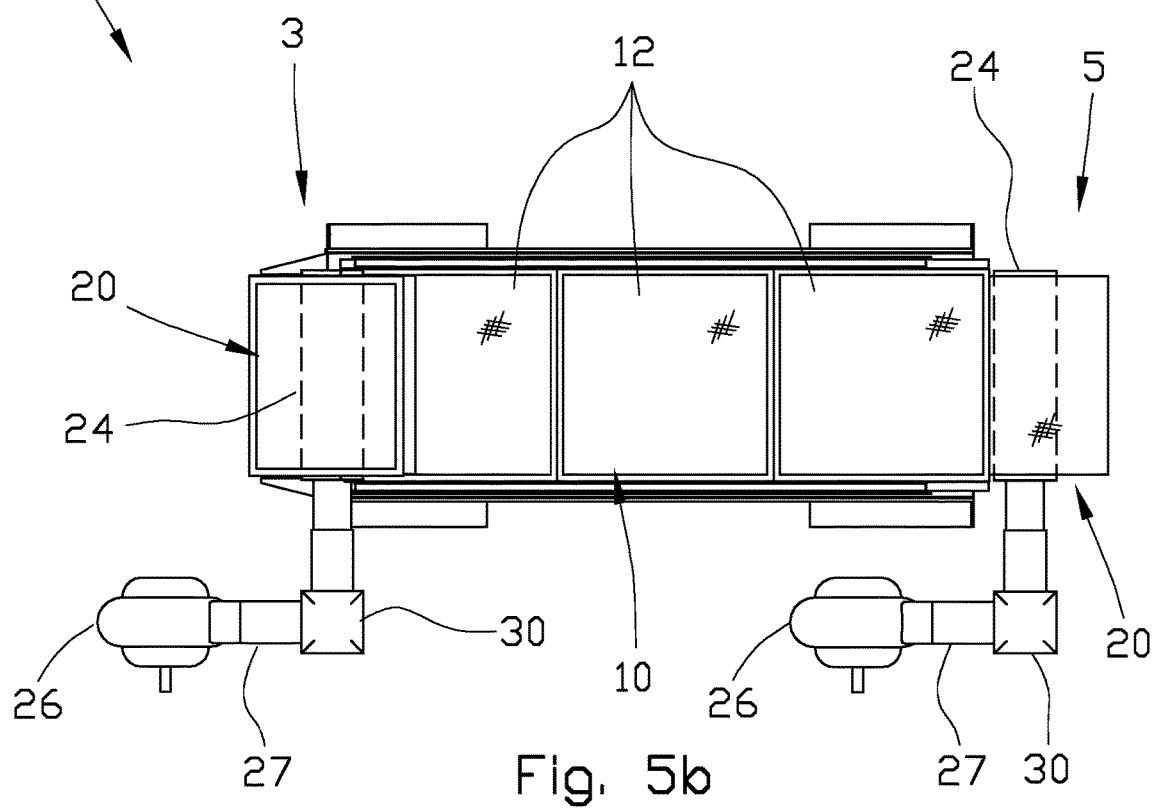

In FIGS. 5a and 5b a further alternative embodiment of the present invention is shown, wherein the sieving apparatus 1 is provided with two endless sieving cloths 20, arranged upstream and downstream of the stationary sieving cloth 10, respectively.

In FIGS. 6a, 6b and 6c a still further alternative embodiment of the sieving apparatus according to the present invention is shown.

In FIGS. 6a, 6b and FIG. 6c, a longitudinal axis of the turning-rollers 22 extends parallel to a longitudinal axis of the stationary sieving cloth 10. In the embodiment shown, the endless sieving cloth 20 is arranged at a higher elevation than that of the stationary sieving cloth 10, so that the solids-containing fluid to be cleansed will first be supplied to the endless sieving cloth 20 before it falls down on the underlying stationary sieving cloth 10. If the turning-rollers 22 are rotated in one direction only, the material falling off the endless sieving cloth 20 will be received in a narrow portion, a "furrow", on the stationary sieving cloth 10. By alternatingly changing the rotational direction of the turning-rollers 22, as shown by the arrow in FIG. 6c, the material being discharged from the endless sieving cloth 20 will be received in two furrows at the stationary sieving cloth 10. By means of said one or two furrows, the material receiving area of the stationary sieving cloth 10 will be distributed over a larger area than being the case if only one limited portion of the stationary sieving cloth 10 receives the supplied solids-containing fluid, which is also denoted material in this document.

As the endless sieving cloth 20 shown in FIGS. 6a, 6b and FIG. 6c is arranged at a higher elevation than the stationary sieving cloth 10, it may be combined with any one of the embodiments shown in the preceding FIGS. 1a-5b.

In FIGS. 7a, 7b and 7c, a still further embodiment of the sieving apparatus according to the present invention is shown. The endless sieving cloth 20 is arranged at the inlet portion 3 of the apparatus 1, and at a higher elevation than that of the stationary sieving cloth 10. In addition to the already mentioned advantage of placing the stationary sieving cloth 20 at the inlet portion 3, the shown embodiment represents some further advantages.

The endless sieving cloth 20 may be arranged to an already existing shaker, without the need for extensive modifications of said shaker. Since the endless sieving cloth 20 is arranged above the stationary sieving cloth 10, the overall footprint of the apparatus 1 will not increase. One of the main advantages is that the endless sieving cloth 20, in such an embodiment, may have a "sorting function" to prevent undesired materials supplied to the sieving apparatus 1, from passing onto the stationary sieving cloth 10. This is accomplished by reversing the direction of movement for the endless sieving cloth 20, so that the upper portion of the cloth 20 will be moved in a direction away from the stationary sieving cloth 10, i.e. from right to left in FIG. 7c. Since the sieving efficiency of the endless sieving cloth 20 is provided by means of a fluid flow, a significant portion of the liquid and gas flowing along with the solids-containing fluid may be separated from unwanted solid particles before these are directed to a sorting path 32, and further into for example a receiving container (not shown) for the separated waste. The unwanted material may for example be metal shavings, which may be very detrimental for the stationary sieving cloth 10, or it may be material that for other reasons is undesirable on the stationary sieving cloth 10. Such a reason could be that the material has a tendency to clog in the openings of the stationary sieving cloth 10. So-called gumbo is one such undesirable material.

Although the sieving apparatus 1 shown in FIGS. 7a, 7b and 7c enables the above mentioned sorting function, the solids-containing fluid will generally be carried from the endless sieving cloth 20 to the stationary sieving cloth 10.

Control of the rotational direction for the endless sieving cloth 20 may be done manually by an operator, or it may be done by means of automatic controls known per se, in which supplied material passes measuring equipment, which again is arranged to provide signals to a control unit.

The endless sieving cloth 20 shown in FIGS. 7a, 7b and 7c is arranged at a higher elevation than that of the stationary sieving cloth 10. It may therefore be combined with any one of the embodiments shown in the preceding FIGS. 1a-5b. It is also conceivable that the endless sieving cloth shown in FIGS. 7a, 7b and 7c, may be combined with and be arranged at a higher elevation than the sieving cloth shown in FIGS. 6a, 6b and 6c, so as to be capable of enabling a sorting function, while at the same time a still further improved separation of liquid and gas from solid particles may be achieved.

The present invention thus provides, by relatively simple means, a sieving apparatus, that may exhibit a significantly improved separation of fluids from solid particles than would be the case for a shaker of a kind known per se. In some of the embodiments of the present invention, an operational time or lifetime for panels 15 in the shaker may be substantially increased, either by preventing the unwanted material from being supplied to the panels 15, and/or by providing a larger supply area onto the panels 15.

The invention claimed is:

1. A sieving apparatus (1) arranged for separating solid particles above a predetermined size from a fluid, the solids-containing fluid is carried across at least one shaker panel (15) comprising a sieving cloth (12) attached to a sieving cloth frame (14), the shaker panel (15) secured to a frame (16), the sieving apparatus (1) comprises:
   a shaking device (18) connected directly to the frame (16) for transmitting a shaking motion from the frame to the at least one shaker panel (15);
   an inlet portion (3) for receiving solids-containing fluid;
   a discharge portion (5) for solids that have been carried across the at least one shaker panel (15) and an outlet portion for fluid that has passed through the shaker panel (15);
   at least one endless sieving cloth (20) arranged for rotating around at least two spaced-apart turning-rollers (22) of which at least one is connected to a motor, wherein a longitudinal axis of the turning-rollers (22) extends substantially in perpendicular to a longitudinal axis (L) of the sieving apparatus (1);
   the shaker panel (15) is arranged over at least a portion of the at least one endless sieving cloth (20), the shaker panel is arranged in the frame (16), the inlet portion (3)

of the sieving apparatus (1) being in connection with the shaker panel (15), so that the solids-containing fluid is supplied from the shaker panel (15) to the endless sieving cloth (20); and a pumping device (26) in fluid communication with a suction nozzle (24) which is located proximate an underside of the endless sieving cloth (20) between two of the turning-rollers (22), to produce a fluid flow through at least a portion of the endless sieving cloth (20).

2. The sieving apparatus (1) according to claim 1, wherein the endless sieving cloth (20) is arranged at the discharge portion (5).

3. The sieving apparatus (1) according to claim 1, wherein the sieving apparatus (1) is provided with at least two endless sieving cloths (20), wherein at least one of the endless sieving cloths (20) is arranged at the inlet portion (3) and at least one of the endless sieving cloths is arranged at the discharge portion (5).

4. The sieving apparatus (1) according to claim 1, wherein the endless sieving cloth (20) is arranged at the inlet portion (3) and is arranged for selectively rejecting any unwanted solids that may be carried in the solids-containing fluid by being set in rotation in such a direction that the solids-containing fluid is carried away from the subsequent stationary sieving cloth (10) and out of the sieving apparatus (1).

5. The sieving apparatus (1) according to claim 1, wherein the endless sieving cloth (20) is arranged at the inlet portion (3).

6. The sieving apparatus (1) according to claim 1, wherein the endless sieving cloth (20) rotation being selectable to direct the solid-containing fluid toward or away from the sieving cloth.

7. The sieving apparatus (1) according to claim 1, wherein the endless sieving cloth (20) being selectably attachable to least one of the frame (16) or a base of the sieving apparatus.

8. A method for separating solid particles above a predetermined size from a solids-containing fluid, the method comprises the steps of:

passing the solids-containing fluid through a sieving device (1) comprising:

at least one shaker panel (15) comprising a sieving cloth element (12) attached to a sieving cloth frame (14), the shaker panel (15) secured to a frame (16);

a shaking device (18) for transmitting a shaking motion from the frame to the at least one shaker panel (15);

an inlet portion (3) for receiving the solids-containing fluid, discharge portion (5) for solids that have been carried across the at least one shaker panel (15); and at least one endless sieving cloth (20) arranged for rotating around at least two spaced-apart turning-rollers (22) of which at least one is connected to a motor, wherein a longitudinal axis of the turning-rollers (22) extends substantially perpendicular to a longitudinal axis (L) of the sieving apparatus (1);

the shaker panel (15) is arranged over at least a portion of the at least one endless sieving cloth (20), the shaker panel is arranged in the frame (16), the inlet portion (3) of the sieving apparatus (1) being in connection with the shaker panel (15), so that the solids-containing fluid is supplied from the shaker panel (15) to the endless sieving cloth (20); and a pumping device (26) in fluid communication with a suction nozzle (24) which is located proximate an underside of the endless sieving cloth (20) between two of the turning-rollers (22), to produce a fluid flow through at least a portion of the endless sieving cloth (20);

an outlet portion for fluid that has passed through the shaker panel (15) and the endless sieving cloths (10, 20);

carrying the solids-containing fluid across at least one shaker panel (15) and over the endless sieving cloth (20), wherein the solid particles in the solids-containing fluid is carried by the sieving cloth (20) substantially without being moved relative to the endless sieving cloth (20), but where a portion of the fluid is separated from the solid particles by means of a pumping device (26) being in fluid communication with a suction nozzle (24).

9. The method according to claim 8, including the step of carrying the solids-containing fluid across the shaker panel (15) being secured to the frame (16) before being carried over the endless sieving cloth (20).

10. The method according to claim 8, including the step of carrying the solids-containing fluid over the endless sieving cloth (20) before being carried across the shaker panel (15) being secured to the frame (16).

11. The method according to claim 8, including the step of carrying the solids-containing fluid first over the endless sieving cloth (20) and then across the shaker panel (15) being secured to the frame (16), before finally being carried over an additional endless sieving cloth (20).

12. The method according to claim 8, including the step of using a first sieving cloth (20) arranged for separating solid particles above a predetermined size from a solids-containing fluid as a rejecting device to prevent undesired material from passing on to a subsequent second sieving cloth (10) which is also arranged for separating solid particles above a predetermined size from a solids-containing fluid.

* * * * *